(12) United States Patent
Park (10) Patent No.: US 8,521,726 B2
(45) Date of Patent: Aug. 27, 2013

(54) FILE MANAGEMENT SYSTEM AND COMPUTER READABLE RECORD MEDIUM FOR THE SAME

(76) Inventor: Soo Min Park, Seoul (KR)

( * ) Notice: Subject to any disclaimer, the term of this patent is extended or adjusted under 35 U.S.C. 154(b) by 0 days.

(21) Appl. No.: 12/676,860

(22) PCT Filed: Sep. 4, 2008

(86) PCT No.: PCT/KR2008/005200
§ 371 (c)(1),
(2), (4) Date: Jun. 22, 2010

(87) PCT Pub. No.: WO2009/031824
PCT Pub. Date: Mar. 12, 2009

(65) Prior Publication Data
US 2010/0262595 A1 Oct. 14, 2010

(30) Foreign Application Priority Data
Sep. 7, 2007 (KR) .................. 10-2007-0090871

(51) Int. Cl.
*G06F 17/30* (2006.01)
(52) U.S. Cl.
USPC ........................................ 707/722; 707/769
(58) Field of Classification Search
USPC ................................ 707/722, 769
See application file for complete search history.

(56) References Cited

U.S. PATENT DOCUMENTS

| | | | |
|---|---|---|---|
| 2006/0036568 A1* | 2/2006 | Moore et al. ................... | 707/1 |
| 2006/0126950 A1 | 6/2006 | Ahn et al. | |
| 2007/0050414 A1* | 3/2007 | Yoshida et al. .............. | 707/200 |
| 2007/0088674 A1 | 4/2007 | Kawate et al. | |
| 2008/0059495 A1* | 3/2008 | Kiessig et al. ............... | 707/100 |
| 2008/0177775 A1* | 7/2008 | Kawate et al. ............... | 707/102 |
| 2008/0222166 A1* | 9/2008 | Hultgren et al. ............. | 707/100 |

FOREIGN PATENT DOCUMENTS

| | | |
|---|---|---|
| KR | 10-2001-0037736 A | 5/2001 |
| KR | 10-2002-0023908 A | 3/2002 |

OTHER PUBLICATIONS

International Search Report for PCT/KR2008/005200.

* cited by examiner

*Primary Examiner* — Wilson Lee
*Assistant Examiner* — Thuy Bui
(74) *Attorney, Agent, or Firm* — LRK Patent Law Firm (57) ABSTRACT

Disclosed herein are a file management system for collectively managing a plurality of files stored and managed in at least one file storage device and a computer-readable recording medium storing a program for performing file management. The file management system includes a file search module for designating one or more fields as search conditions and then searching for one or more files, listing found files together with registration information and then displaying this list on a screen, and listing a plurality of files together with registration information and then displaying this list on the screen; a registration information management module for performing entry, deletion and modification of file registration information and addition and deletion of one or more file registration information fields; and a rearrangement module for, using one or more selected file registration information fields as criteria for arrangement, changing a relevant folder structure with reference to registration information of files at selected locations and rearranging files and folders.

1 Claim, 10 Drawing Sheets

| | Management of PC data | | Management of Internet data | |
|---|---|---|---|---|

[search conditions]
- ○ materials which have been written and registered during recent days and for which subject words have not been entered (Default)
- ○ designation of recent days : From ~ to
- ○ designation of folders (or files) : search for folders (or files)

Fields to be added (author, date of authoring, category and the like) ▽

Fields to be deleted (author, date of authoring, category and the like) ▽

| do | cancel |
|---|---|

| | file name | storage location (folder name) | author | subject word (keyword) | |
|---|---|---|---|---|---|
| 1 | weekly meeting material. hwp | c:\project/,,,,/5May | Su-min Park | team task schedule. patent application, multi-dimensional explorer | verify |
| 2 | task reference material. hwp | c:\meeting material/,,,,/Gil-dong Hong | Su-min Park | reference material, detailed statistics.... | verify |
| 3 | instruction report. doc | | Dong-hwan Kim | | verify |
| 4 | instruction report (modified) doc | | | | verify |
| 5 | instruction report (additionally modified). doc | | | | verify |
| 6 | legal study draft. doc | | Su-min Park | | verify |
| 7 | customer access trend. xls | | | | |
| 8 | Jeju conference. ppt | | | | |
| 9 | Juju conference (final plan). ppt | | | | |
| 10 | after conference. jpg | | | | |
| 11 | after conference. jpg | | | | |
| 12 | conference full video. avi | | | | |
| 13 | advanced country market trend. pdf | | | | |
| 14 | : | | | | |

Fig. 6

|   | file name | date of authoring | author | ... | subject word (keyword) | |
|---|---|---|---|---|---|---|
| 1 | weekly meeting material. hwp | May 12, 2002 | Su-min Park | | team task schedule. patent application, multi-dimensional explorer | verify |
| 2 | task reference material. hwp | May 13, 2002 | Su-min Park | | reference material, detailed statistics.... | verify |
| 3 | instruction report. doc | | Dong-hwan Kim | | | verify |
| 4 | instruction report (modified) doc | | | | | verify |
| | : | | | | | |

Fig. 7

| Management of PC data | Management of Internet data |
|---|---|

[search conditions]
- ○ materials which have been written and registered during recent days and for which subject words have not been entered (Default)
- ○ designation of recent days : From ~ to
- ○ designation of category (or data) : search for category (or data)

| Fields to be added (author, date of authoring, category and the like) ▽ | | do | cancel |
|---|---|---|---|
| Fields to be deleted (author, date of authoring, category and the like) ▽ | | | |

|   | material (post) name | storage location | author | tag (subject word, keyword) | |
|---|---|---|---|---|---|
| 1 | ten books that must be read | http://blog.naver.com/spakkk/140039409751 | Su-min Park | book list, promoted books, recommended books.... | verify |
| 2 | Cape Town story | http://blog.naver.com/spakkk/140039409678 | Su-min Park | travel material, Republic of South Africa, Africa.... | verify |
| 3 | The only place into which money flows is the securities market | | Dong-hwan Kim | | verify |
| 4 | causes of financial crisis | http://memolog.blog.naver.com/spakkk/6 | | | verify |
| 5 | : | | | | |

Fig. 8

|   | file name | date of authoring | author | ... | subject word (keyword) | |
|---|---|---|---|---|---|---|
| 1 | ten books that must be read | May 12, 2002 | Su-min Park | | book list, promoted books, recommended books.... | verify |
| 2 | Cape Town story | May 13, 2002 | Su-min Park | | travel material, Republic of South Africa, Africa.... | verify |
| 3 | The only place into which money flows is the securities market | | Dong-hwan Kim | | | verify |
| 4 | causes of financial crisis | | | | | verify |
| 5 | : | | | | | |

Fig. 9

| Rearrangement of folders | | | |
|---|---|---|---|
| | | do | cancel |
| first criterion | second criterion | third criterion | fourth criterion |
| author | year of authoring | category | subject word |

Fig. 10

-Su-min Park - 2005 - task A
- task B
- task C

- 2006 - task X
- task Y
- task Z

- 2007 - task A
- task X
- task M

-Jung-a Kim - 2005 - nursing diary
- photo
- translation

- 2006 - nursing diary
- photo
- housekeeping account book

- 2007 - task A
- task X
- task M

Fig. 11

| | | Rearrangement of folders |
|---|---|---|
| | | do / cancel |
| first criterion | second criterion | third criterion |
| year of authoring | subject word | author |

Fig. 12

-2005  - task A  - Su-min Park
                 - Dong-han Kim
                 - Han-sung Choi

- task B  - Seung-hwan Kang
                  - Su-min Park
                  - Dong-hwan Kim

- task C  - Su-min Park
                  - Dong-han Kim
                  - Han-sung Choi -2005  - task X  - Su-min Park
                 - Dong-han Kim
                 - Han-sung Choi

- task Y  - Seung-hwan Kang
                  - Su-min Park
                  - Dong-hwan Kim

- task Z  - Su-weon O
                  - Dong-hwan Kim
                  - Han-sung Choi

```
-photo   - 2005  - tag A
                 - tag B
                 - tag C

- 2006  - tag X
                 - tag Y
                 - tag Z

- 2007  - tag A
                 - tag X
                 - tag M

-text    - 2005  - nursing diary
                 - photo
                 - translation

- 2006  - nursing diary
                 - photo
                 - housekeeping account book

- 2007  - task A
                 - task X
                 - task M
```

Fig. 15

| | | Rearrangement of folders |
|---|---|---|
| | | do / cancel |
| first criterion | second criterion | third criterion |
| year of authoring | subject word | author |

Fig. 16

```
-2006  - tag A  - photo
                - text
                - recipe

- tag B  - photo
                - text
                - recipe

- tag C  - photo
                - text
                - recipe

-2005  - tag X  - photo
                - text
                - recipe

- tag Y  - photo
                - text
                - recipe

- tag Z  - photo
                - text
                - recipe
```

Fig. 17

```
                    ┌─────────────────┐
                    │ Rearrangement of│
                    │ files and folders│
[files to be rearranged]
    ┌─────────────────────────────────────────────────┐
    │          Windows Explorer window form           │
    │                                                 │
    │                                                 │
    │                                                 │
    └─────────────────────────────────────────────────┘

┌─────────┬─────────┐
                                    │ confirm │ cancel  │
                                    └─────────┴─────────┘
```

| | rearrangement target files/folders (current sequence) | | | sequence of rearrangement |
|---|---|---|---|---|
| 1 | task reference material. hwp | | 1 | instruction report. doc |
| 2 | weekly meeting material. hwp | | 2 | instruction report (modified). doc |
| 3 | instruction report. doc | | 3 | instruction report (additionally modified). doc |
| 4 | instruction report (modified). doc | | 4 | weekly meeting material. hwp |
| 5 | instruction report (additionally modified). doc | | 5 | task reference material. hwp |
| 6 | : | | 6 | |

Fig. 18

```
                                          ┌──────────────────────┐
                                          │ Transmission of file to│
                                          │  multiple destinations │
[fetch file to be transmitted]
    ○ designation of recent days : From ~ to           ┌──────────┬────────┐
    ○ designation of folder (or file) : search for folder (or file) │ transmit │ cancel │
                                                       └──────────┴────────┘
```

| | file name | destination | | | |
|---|---|---|---|---|---|
| 1 | weekly meeting material. hwp | O KMS  O electronic payment  O E-mail<br>O instant messaging  O team leader's computer | | | transmit |
| 2 | task reference material. hwp | O KMS  O electronic payment  O E-mail<br>O instant messaging  O team leader's computer | | | transmit |
| 3 | instruction report. doc | O KMS  O electronic payment  O E-mail<br>O instant messaging  O team leader's computer | | | transmit |
| 4 | : | | | | |

FILE MANAGEMENT SYSTEM AND COMPUTER READABLE RECORD MEDIUM FOR THE SAME

TECHNICAL FIELD

The present invention relates, in general, to a file management system and a computer-readable recording medium storing a program for performing file management, and, more particularly, to a file management system capable of collectively processing the arrangement, reclassification and changes in registration information of files (data) stored in one or more Personal Computers (PCs) or one or more Internet blogs, and a computer-readable recording medium storing a program for performing file management.

BACKGROUND ART

It is necessary to periodically arrange and reclassify PC or Internet data (files) in the same way as it is necessary to periodically arrange and reclassify documents or books on a desk. Although the burden of file management has increased due to the rapid increase in the amount of data stored in Personal Computers (PCs) or recorded in Internet blogs by individuals, there is no file management software capable of alleviating such a burden.

For example, every file includes registration information such as a subject word, an author, the date of authoring, and the like. The entry and modification of such registration information are very burdensome because the registration information of each file must be searched for, desired tabs must be searched for, an author, a category, a date, the date of authoring, a subject word or the like must be input, and five to six clicks are required to open an input window for the registration information of a single file.

In particular, almost every user has many files that were authored on the same task or subject in the same period and have the same subject word, author and category. However, since a function of simultaneously entering registration information, such as a subject word, an author and a category, into such files is not supported, each of the files must be opened and the registration information must be entered into each file, which causes the increase in the number of clicks in geometric progression.

Furthermore, it is very burdensome to change the structure of a classification of files managed in one or more PCs or Internet blogs. That is, in the case of a PC, in order to change an existing folder system to a new one, it is necessary to newly create one or more folders, select corresponding files, and copy or move the selected files. In the case of a blog, it is necessary to newly create one or more categories and move data individually. Furthermore, in the situation in which the number of files which have accumulated in a period, such as a month, is extremely large, it is impossible to perform such re-classification work.

With regard to a file searching function, in the case of a PC, Windows basic searching enables the use of searching conditions, such as a file name, a folder name, a word or sentence included in a file, the date of modification and a file size. Since there are limitations on searching conditions to be selected, it is not easy to search for the specific file desired by a user. That is, when searching is performed using only a file name and a folder name, a desired file is not accurately found, but there are many cases where unrelated files are found. Meanwhile, although a system capable of searching the entire file content exists, an excessively large number of files are presented as search results in the case where the entire file content is searched, with the result that there is inconvenience in that all the files returned in the search results must be opened and examined.

Meanwhile, currently, Internet blogs provide a function of entering subject words, called 'tags,' so that a search function may be considered to have been upgraded by one level, compared to that of a PC, and a process of entering tags is somewhat more convenient than a process of entering the registration information of files managed in a PC because a tag information entry window can be opened using a small number of clicks.

However, although the process of entering information is more convenient than that for a PC, this system is still a system that enters tags for respective files (respective pieces of data or respective posts), and is still lacking a function of conveniently entering authors, the dates of authoring and other registration information.

As a result, in the case of data stored in Internet blogs, it is easy to enter tags first, but it is very difficult to modify input tags or a setup category system, as in a PC.

Meanwhile, the non-systematic management of the files of individuals not only inconveniences the individuals but also adversely influences the overall work efficiency of a company or an organization significantly. Accordingly, companies or organizations utilize a central classification and storage method of storing individual employees' files in separate central servers.

Meanwhile, unfortunately, existing central server systems using such a central classification and storage method are not successful systems either.

The reasons for this are that employees do not frequently use central server systems because a process of registering data in the central server systems is burdensome from the point of view of the employees, only a small amount of data is uploaded unless uploading is made compulsory, the utility of the central server systems becomes degraded because an excessively large amount of data is accumulated when uploading is entrusted to individuals and is made compulsory, and there are many cases where the necessary data is lacking even though a large amount of data is returned.

As a result, the provision of a separate system for systematically classifying and searching for the data of individuals stored in PCs without change is needed, and a method of selecting and uploading only necessary files on the basis of the system needs to be applied to the existing central server system.

DISCLOSURE OF INVENTION

Technical Problem

Accordingly, the present invention has been made keeping in mind the above problems occurring in the prior art, and an object of the present invention is to provide a file management system for enabling registration information of files stored in one or more PCs or the Internet to be entered or modified in a simple manner and re-classifying and rearranging files and folders under various search conditions using the registration information as one or more indexes, and a computer-readable recording medium storing a program for performing file management.

Another object of the present invention is to enable search for files using file registration information as one or more indexes, enable the collective display of the registration information of a plurality of files, such as the file names, storage locations, authors, the dates of authoring and subject words of the files, such as file search results, and enable registration information to be modified or entered on a relevant screen in a simple manner.

A further object of the present invention is to provide a file management system for enabling the registration information of a plurality of files to be collectively entered or modified, providing a function of entering words in respective fields of registration information by default and confirming the words through a user's verification and a function of automatically creating default entries, and enabling one or more fields desired by a user to be added or deleted and then allowing data managed in one or more PCs and the Internet to be managed in a form desired by the user, and a computer-readable record medium storing a program for performing file management.

Technical Solution

In order to accomplish the above objects, the present invention provides a file management system for collectively managing a plurality of files stored and managed in at least one file storage device, the file management system including a file search module for designating one or more fields selected by a user from file registration information, including a plurality of fields, as search conditions and then searching for one or more files stored in the file storage device, listing found files together with registration information of these files and then displaying this list on a screen, and listing a plurality of files selected by the user together with registration information of these files and then displaying this list on the screen; a registration information management module for performing entry, deletion and modification of file registration information and addition and deletion of one or more file registration information fields, with respect to the files included in the list, in response to the user's input on the screen on which the list has been displayed by the file search module; and a rearrangement module for, using one or more file registration information fields selected by the user as criteria for arrangement, changing a relevant folder structure with reference to registration information of files at locations selected by the user and rearranging files and folders.

Here, the rearrangement module may arrange files and folders in a sequence designated by the user.

Preferably, when a change of registration information is requested by the user in a situation in which a plurality of files has been selected, the registration information management module collectively changes registration information of the plurality of files through the user's single input.

Meanwhile, the file management system may further include an integrated transmission module for enabling a transmission method/location of each of a plurality of files selected by the user to be selected on a single screen, and, when the transmission method/location is selected and transmission of a file is requested, transmitting the file to the relevant transmission location using the relevant transmission method.

Here, the file transmission method/location may be any one of an external system connected over a network, email and instance messaging.

The file management system is a system installed in a Personal Computer (PC), and may manage files of a file storage device inside the relevant PC.

The file management system is a system installed in a PC, and may collectively manage files of file storage devices inside the relevant PC and a plurality of PCs connected over a network.

The file management system is a system installed in a PC, and may manage files of a file storage device inside an Internet server.

The file management system is a system installed in an Internet server, and may manage files of a file storage device inside one or more PCs connected over an Internet.

In order to accomplish the above objects, the present invention provides a computer-readable recording medium for collectively managing a plurality of files stored and managed in at least one file storage device, the computer-readable recording medium including a file search function of designating one or more fields, which are selected by a user from file registration information, including a plurality of fields, as search conditions and then searching for one or more files stored in the file storage device, listing found files together with registration information of these files and then displaying this list on a screen, and listing a plurality of files selected by the user together with registration information of these files and then displaying this list on the screen; a registration information management module of performing entry, deletion and modification of file registration information and addition and deletion of one or more file registration information fields, with respect to the files included in the list, in response to the user's input on the screen on which the list has been displayed by the file search module; and a rearrangement function of, using one or more file registration information fields selected by the user as criteria for arrangement, changing a relevant folder structure with reference to registration information of files at locations selected by the user and then rearranging files and folders.

Here, the rearrangement function may be a function of arranging files and folders in a sequence designated by the user.

The registration information management function may be a function of, when a change of registration information is requested by the user in a situation in which a plurality of files has been selected, collectively changing registration information of the plurality of files through the user's single input.

Meanwhile, the program may further perform an integrated transmission function of enabling a transmission method/location of each of a plurality of files selected by the user to be selected on a single screen, and, when the transmission method/location is selected and transmission of a file is requested, transmitting the file to the relevant transmission location using the relevant transmission method.

Here, the file transmission method/location may be any one of an external system connected over a network, email and instant messaging.

Advantageous Effects

In accordance with a file management system and a computer-readable recording medium storing a program for performing file management according to the present invention, the registration information of files stored in one or more PCs or the Internet can be entered or modified in a simple manner and files and folders can be reclassified and rearranged under various search conditions using the registration information as one or more indexes, thereby maximizing a user's convenience.

Furthermore, in accordance with the present invention, searching for files can be performed using file registration information as one or more indexes, and the registration information of a plurality of files, such as the file names, storage locations, authors, the dates of authoring and subject words of the files, such as file search results, is collectively displayed, so that there is an advantage in that registration information can be modified or entered on a relevant screen in a simple manner.

Furthermore, in accordance with the present invention, there are advantages of managing data, managed in one or more PCs or over the Internet, in the specific form desired by a user and reducing the time and cost consumed by the management of data.

MODE FOR THE INVENTION

The details of the above objects, the technical constructions and operational effects of the present invention will be more clearly understood from the following detailed description taken in conjunction with the accompanying drawings.

Figure 1:
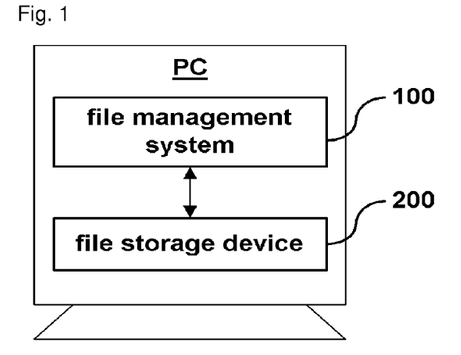
FIGS. 1 to 3 are diagrams illustrating the concept of a file management system according to an embodiment of the present invention.
Figure 2:
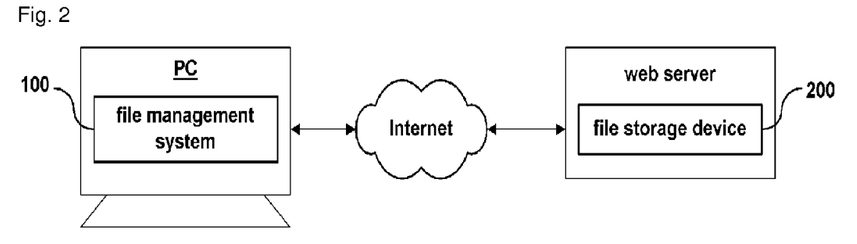
Figure 3:
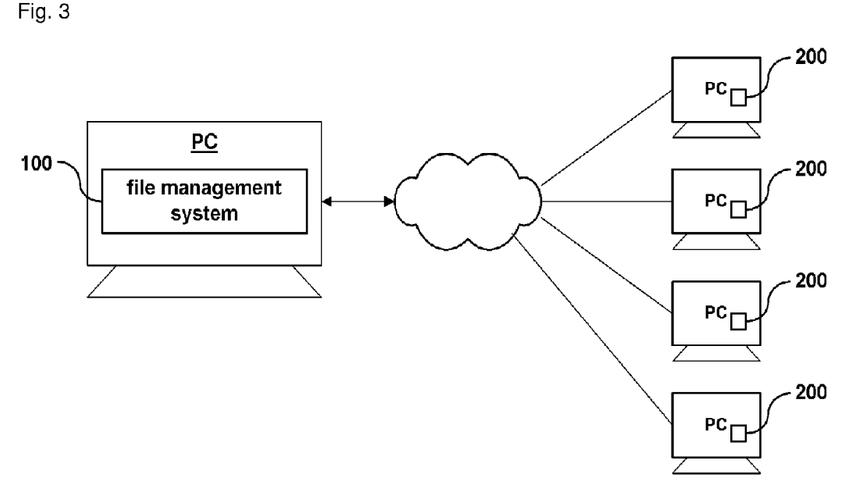

First, FIGS. 1 to 3 are diagrams illustrating the concept of a file management system according to an embodiment of the present invention.

As shown in FIG. 1, a file management system 100 according to the present invention is a system for managing files that are stored and managed in one or more file storage devices 200a inside a PC, a web server, and a plurality of PCs connected over a network.

Meanwhile, the file management system 100 of the present invention may be installed in a PC, as shown in FIG. 2, or, if necessary, may be installed in a web server and provide an Internet-based file management function, as shown in FIG. 3.

That is, the file management system 100 is a system that is installed in an Internet (web) server. The file management system 100 may remotely manage the files of the storage device of a PC that makes access over the Internet, and may manage the files of a relevant user that are stored and managed by a relevant Internet server.

Figure 4:
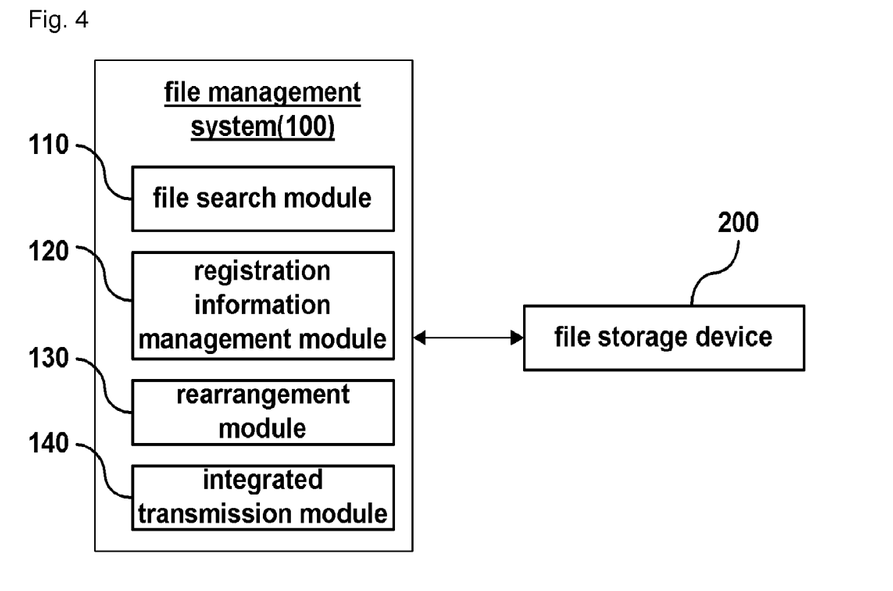
FIG. 4 is a diagram showing the construction of a file management system according to an embodiment of the present invention.

FIG. 4 is a diagram showing the construction of a file management system according to one embodiment of the present invention.

As shown in this drawing, the file management system 100 of the present invention may include a file search module 110, a registration information management module 120, a rearrangement module 130, and an integrated transmission module 140.

The file search module 110 is a module that searches for files stored in the file storage device 200 and displays search results, so that a user can perform a function of modifying, rearranging or collectively transmitting registration information on a relevant display screen.

The file search module 110 allows the designation of one or more fields which are selected by a user from the file registration information, including a plurality of fields, as one or more search conditions, searches for files stored in the file storage device 200, lists found files together with the registration information of the respective files, and displays the list on the screen. Here, the conditions of searching for files may include keywords that are entered by the user as part of the file registration information, through which the accuracy of file searching can be improved.

Furthermore, the file search module 110 may list a plurality of files, selected by the user, along with the registration information of the respective files, and output the list onto the screen.

The registration information management module 120 functions to, according to the input of the user on the screen onto which the list is output by the file search module 110, input, delete and modify the file registration information of each of the files included in the list, and add and delete one or more fields to and from the file registration information fields.

That is, the registration information management module 120 is a module that displays file registration information in distinguishable fields on a single screen, enables the user to input, delete or modify the registration information on the screen, and fulfills the user's demands for newly adding a desired field or deleting an unnecessary field.

Although in most current environments, such as PC environments, modified registration information must be input for respective files in the case where it is necessary to uniformly modify the registration information of the files, the present invention provides a function in which the registration information management module 120 enables the user to uniformly modify the registration information of a plurality of files through a single input by using a method of enabling the user to access a registration information modification menu option through a right mouse button in the state in which the plurality of files has been selected by the user.

The function of uniformly modifying the registration information of a plurality of files may include, for example, a function of modifying a plurality of file names at the same time. In this case, respective serial numbers may be added to the file names automatically or at the demand of a user while a file name input by a user is applied to the files. For example, if a user selects five files and designates 'data management' as a file name, the file names of the files may be modified to 'data management 1', 'data management 2', 'data management 3', 'data management 4', and 'data management 5,' respectively.

Meanwhile, in the present invention, the 'registration information' refers to all the information about each file. The registration information may be a file name, a storage location, an author, the date of authoring, a subject word (keyword), and the type of registration information. The number of pieces of registration information is limited in the present invention.

The rearrangement module 130 performs an operation of, with reference to the registration information of files at locations selected by a user, modifying a relevant folder system and rearranging files and folders, using one or more file registration information fields selected by the user as arrangement criteria.

In this case, the rearrangement module 130 may provide a function of arranging files and folders in the sequence designated by the user. In general, in the case where an operation is performed in a PC in which a file and folder arrangement system is fixed, file names or folder names may be changed in order to arrange files and folders in the sequence designated by the user in a relevant operation environment. In this case, file names or folder names may be changed using file registration information or the numerals of the sequence designated by the user.

The integrated transmission module 140 is a module that enables the transmission methods/locations of respective files to be selected for the files, selected by a user, on a single screen and performs control so that the files can be transmitted to the relevant transmission locations using the relevant transmission methods when the transmission methods/locations are selected and the transmission of files is requested.

That is, the integrated transmission module 140 is operated using a method that enables a user to select a plurality of files and access a file transmission menu option using a right mouse button or the like, and provides a screen that enables the user to enter file transmission methods/locations for the respective selected files.

Here, the file transmission methods/locations may be external systems connected over a network, such as a central server system or an electronic payment system, email, or instant messaging. Here, the external systems include intra-office systems connected over a local network or systems connected over the Internet.

Meanwhile, the integrated transmission module 140 can control an email program, a file transmission program and an instant messaging program so as to transmit files based on the methods/locations selected by the user, and may be implemented in the form in which a variety of file transmission programs is contained in the integrated transmission module 140 itself.

Meanwhile, the operation of the file management system 100 of the present invention will be described in conjunction with the example screens of FIGS. 5 to 18.

An example of the operation of the file search module 110 for searching for files (or data) stored in one or more PCs and an example of the operation of the registration information management module 120 for enabling the registration information (keywords, authors, dates and the like) of the found files to be easily input or modified will be described below.

Figure 5:
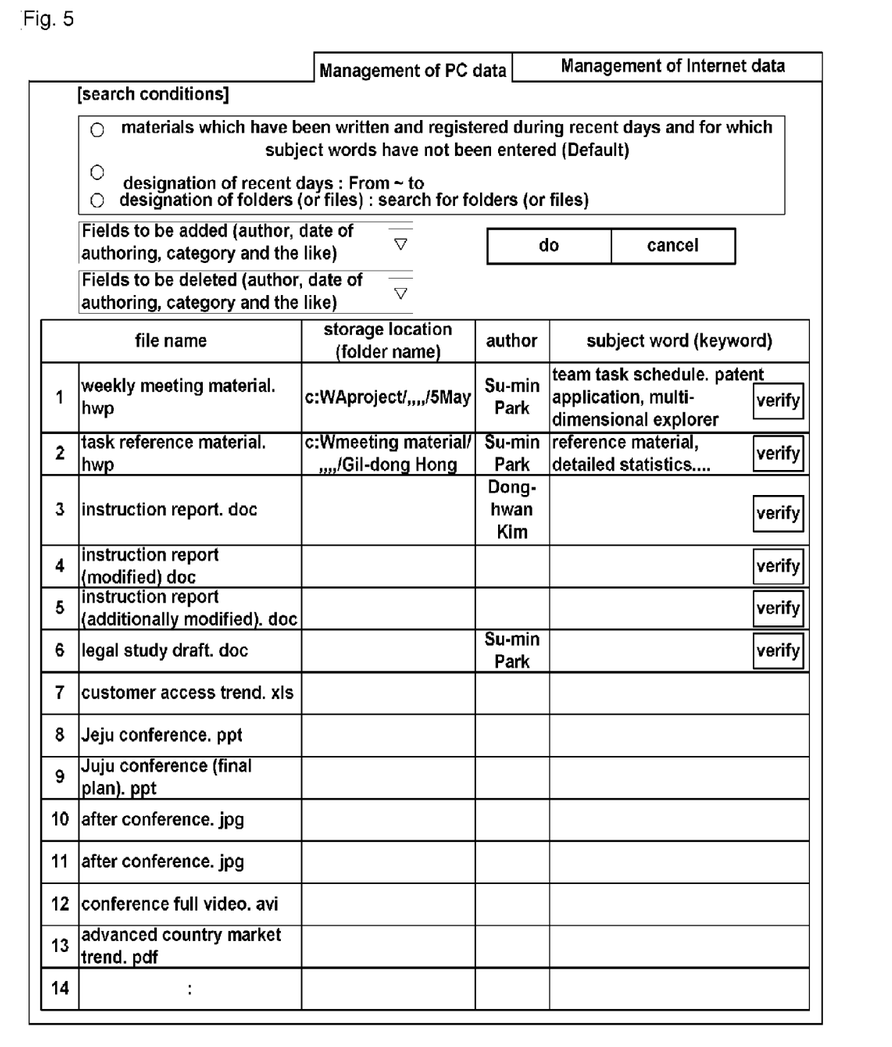
FIGS. 5 to 18 are example screens illustrating the operation of the file management system according to the present invention.

For example, the file search module 110 may search for files that meet a specific condition set by a user, such as 'files on which work has been done during the last week' and for which subject words have not been entered, and may display the files in a form such as that shown in FIG. 5.

Here, the 'specific condition' may be a combination of various conditions, or may be designated and registered by a user in advance. When necessary, it is possible to read relevant files while designating a condition. For example, a file search target may be 'files for which subject words have not been entered, among files on which work has been done during the last week,' all files that belong to a specific folder, or all files that contain a specific subject word.

On the screen of FIG. 5, a user can quickly input or modify the registration information of one or more files using author and subject word (keyword) fields. Here, the name of the author of a file is entered in an author field. It is desired that the number of a plurality of persons are entered therein using separation marks such as commas. Meanwhile, a related task to be used later to search for a file may be entered in the subject word (keyword) field. It is possible to enter a plurality of subject words related to a relevant file using delimiting characters such as commas.

Meanwhile, the registration information management module 120 may provide a function of entering words in respective fields, such as author and subject word fields, by default, and confirming the words through user verification (or a user's verification after modification).

For example, in the case of an 'author,' a PC user name may be automatically entered in blurry characters by default, and, when the user verifies (or modifies and then verifies) the name, the entry may be changed to clear characters and then the clear entry is entered.

Furthermore, in the case of a subject word, a subject word may be automatically created through the combination of words that frequently appear in a file name, file content or the like by default. In this case, it is preferable to change a default entry (in blurry characters) to a normal entry (in clear characters) through modification or confirmation by a user.

In particular, in the case of subject words, in order to create defaults, the registration information management module 120 may provide a function of entering a keyword pool in advance, and utilize the keyword pool when default keywords are created. That is, a user can register in advance keywords that are likely to be frequently used, such as the names of important tasks, thereby enabling the registered keywords to be used when keywords are automatically created for respective files.

Furthermore, as shown in FIG. 5, the registration information management module 120 enables a user to add or delete a field to be displayed on a screen using the field 'field to be added' or 'field to be deleted.'

Figure 6:
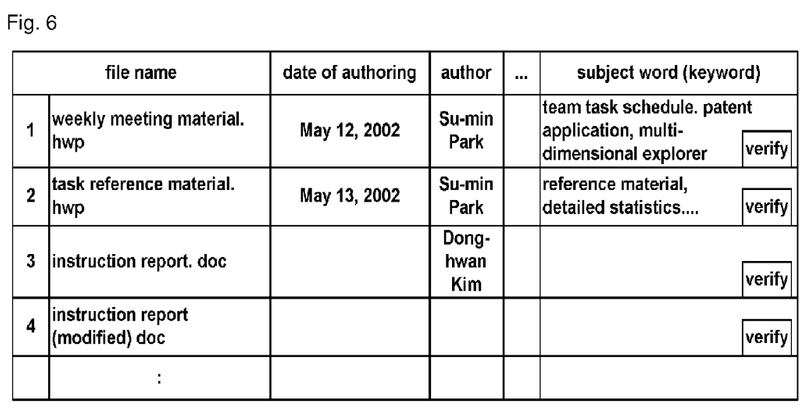

That is, if on the screen of FIG. 5, a 'storage location' field is deleted and the 'date of authoring' field is added, the configuration of the screen may be changed to that of FIG. 6.

Furthermore, the registration information management module 120 of the present invention provides a function of inputting or modifying the registration information of a plurality of files at the same time.

In the actual performance of working on files, the subject words of all files are not different from each other, and there are many cases where many files contain the same subject word. That is, in the case of files having similar content which were created during the performance of a singular task, registration information, such as subject words, authors and the like, is the same and it is inefficient to input (modify) registration information for individual files. Therefore, the registration information management module 120 of the present invention can collectively input or modify the registration information of a plurality of files.

Methods of simultaneously inputting or modifying the registration information of a plurality of files may be of various types. In an example, the registration information management module 120 may provide menu options, such as 'subject word entry/modification', 'author entry/modification,' for a right mouse button menu in the state in which a plurality of files has been selected through mouse scrolling.

Meanwhile, the registration information management module 120 enables registration information, input through the screen, to be finally input as the registration information of relevant files when a verification button and an execution button are sequentially pressed. Alternatively, it is possible according to a user's selection to omit such a procedure and apply input registration information as the registration information of a relevant file as soon as the registration information is input. Furthermore, it is possible to cancel input information using a cancellation button.

Figure 7:
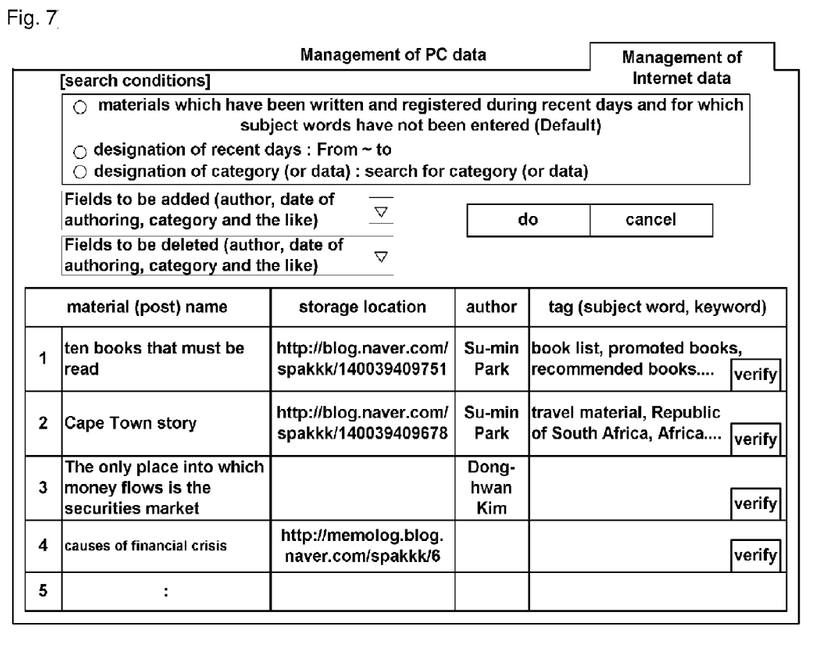
Figure 8:
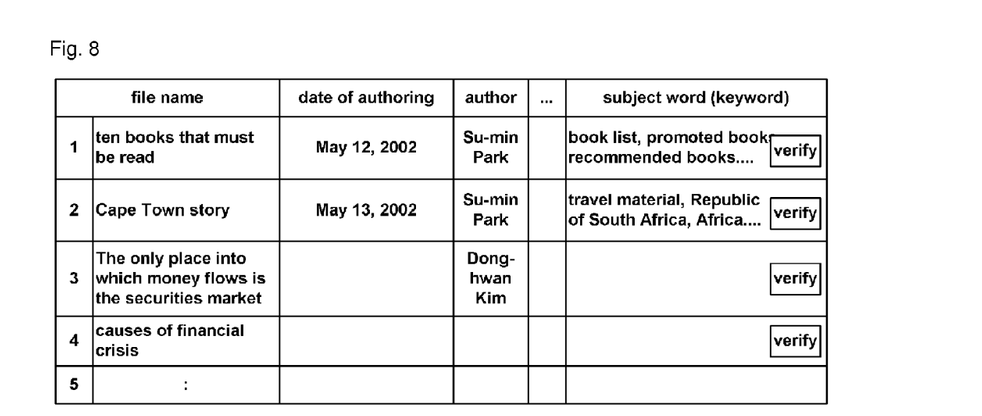
Figure 9:
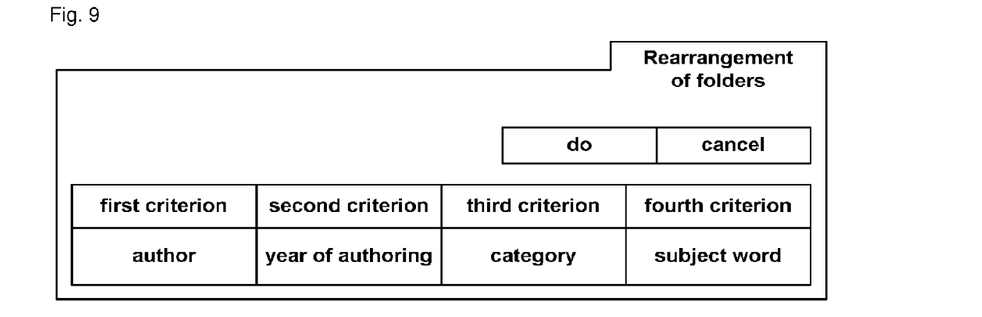
Figure 10:
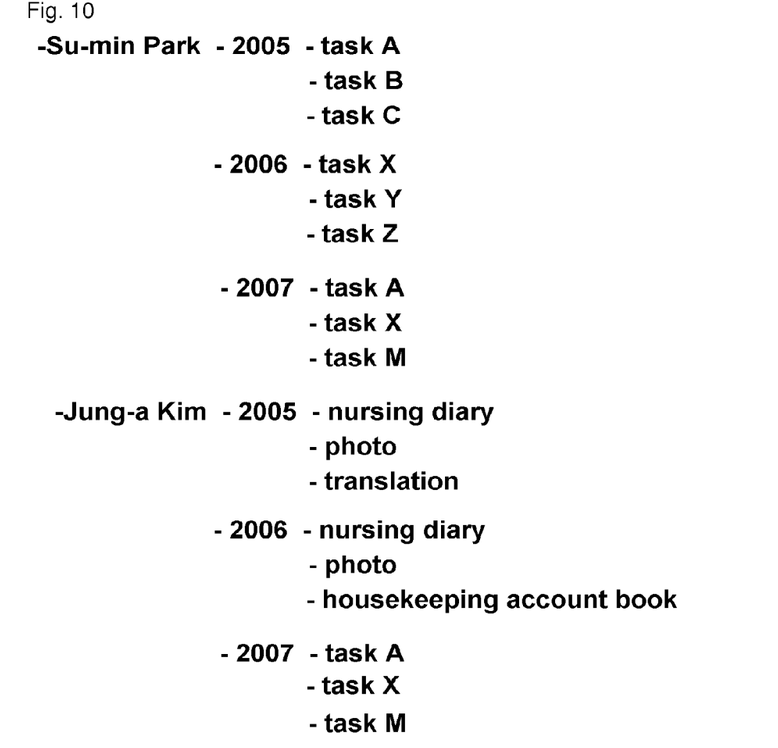
Figure 11:
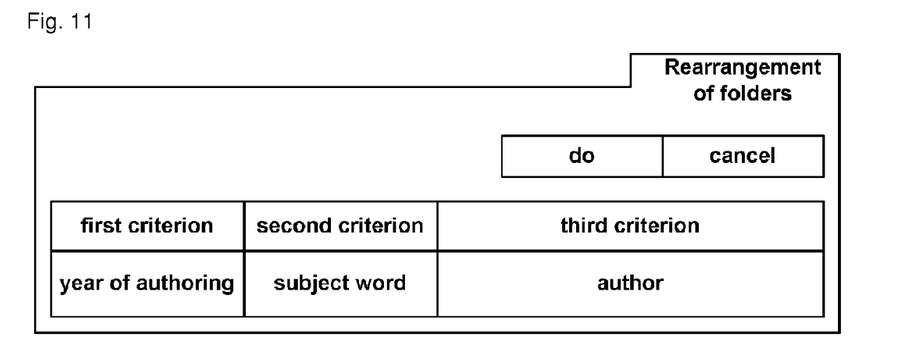

FIGS. 7 and 8 show example screens illustrating the management of the registration information of data stored in an Internet server (blog). As shown in this drawing, the file management system 100 of the present invention may be used for the management of files managed by an Internet server in the same manner.

Since the present invention of the file management system 100 operates in the case of management of files in an Internet server in the same manner as in the case of management of files in a PC, a separate description thereof is omitted here.

Meanwhile, the file management system 100 of the present invention also includes the rearrangement module 130 having a function of arranging the registration information (keywords, authors, dates and the like) of files in the sequence designated by the user (in the sequence of date-author-subject word or the like) and displaying the information in the folder form used by Windows Explorer, that is, a multi-dimensional classification/arrangement function.

The current Windows version classifies files only based on a folder structure stored in a PC. The current Windows only classifies and shows files stored according to a first stored folder system, but does not provide a function of reclassifying and displaying files in the sequence of date (a file written in 2005, a file written in 2006, a file written in 2007, and the like), author (Su-min Park, Dong-hoan Kim, Han-sung Choi and the like) or subject word (politics, economy, society and the like) or the like regardless of the folder system. However, since an optimum classification system varies with the user or circumstances, it is not desirable to provide a specific classification system. Accordingly, in the present invention, the rearrangement module 130 for freely converting and displaying a folder structure using the registration information (author, the date of authoring, subject word and the like) of respective files is provided.

The operation of the rearrangement module 130 will be described below.

First, a user designates a range in which he or she desires to rearrange a folder structure through an Explorer screen. For example, the user may designate the entire C drive, a specific folder, or a plurality of specific files as a rearrangement range or location.

When the user selects a folder rearrangement menu option for the designated range, the rearrangement module 130 runs and outputs a folder rearrangement screen, the user may select one or more rearrangement criteria on a folder rearrangement screen, and the number of rearrangement criteria may be increased or decreased.

As shown in FIGS. 9 to 12, when the user sets up the rearrangement criteria and presses an execution button, the rearrangement module 130, according to the criteria designated by the user, converts the registration information of all files within the designated range into a folder and rearranges related files.

Furthermore, the rearrangement module 130, as shown in FIGS. 13 to 16, operates on an Internet server, such as one hosting a blog, in the same way, and rearranges files/categories.

Furthermore, the rearrangement module 130 connects a plurality of PCs, and arranges and displays the registration information (keywords, tags, authors, dates or the like) of files stored in the respective PCs in the sequence designated by the user (the sequence of date-author-subject word, or the sequence of author-date-subject word).

In this case, the user may manage files stored in the plurality of PCs in a single-structured DB form while maintaining the stored files as they are. For this purpose, the rearrangement module 130 may perform an operation of reading the registration information of the files stored in the plurality of PCs shared over a network, indexing the registration information, and arranging and displaying the registration information according to various criteria.

For example, the rearrangement module 130 may arrange and display files in the sequence of subject word-department name-file name file. It is preferred that the user be allowed to centrally and collectively modify 'subject words having the same meanings', 'subject words having similar meanings' or the like, thereby providing uniformity of classification. For example, the user who is centrally managing files stored in a plurality of PCs may unify the spacing of words, or may modify similar words as a single unified word.

Furthermore, if, as a result of the classification of registration information, such as subject words, an upper 'superclass' is required, the rearrangement module 130 creates the 'superclass' at the request of the user and the superclass may have a plurality of layers when necessary. For example, when there are project A, project B and project C as subject words, 'project' may be created as their superclass.

In an environment in which a plurality of PCs is being managed, it is preferable to provide a shortcut to a file name and allow the file of a relevant PC to be read from another PC connected over a network when a file name is clicked.

Meanwhile, the rearrangement module 130 performs an operation of rearranging files or folders in the sequence desired by the user.

Figure 17:
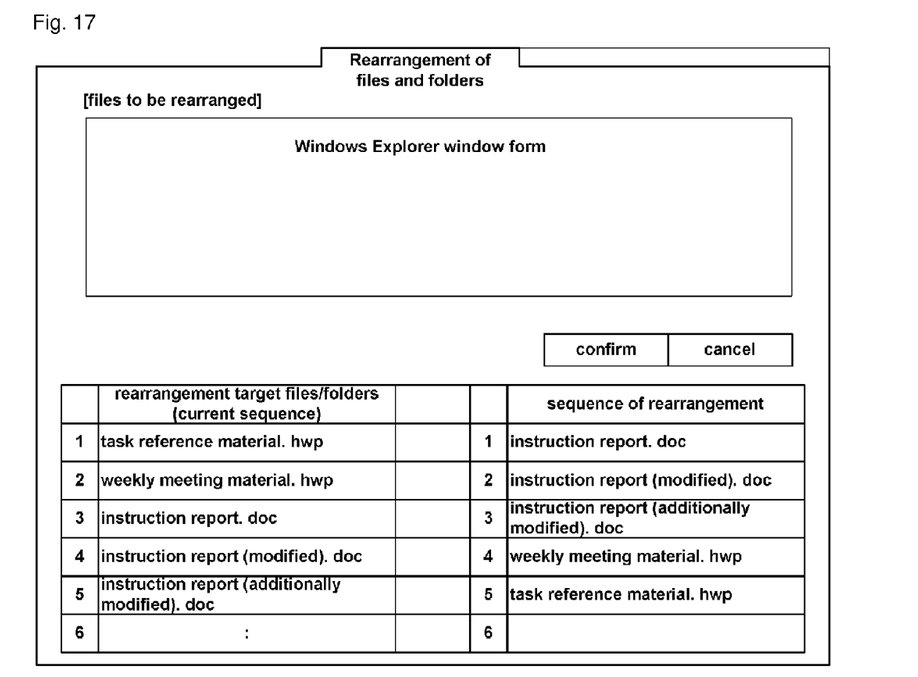

That is, as shown in FIG. 17, the user selects files or folders within the range desired for rearrangement on a Windows Explorer window or a separate screen, runs the rearrangement module 130, and then may adjust the sequence of arrangement of the selected files or folders on the screen. When the user presses a 'Do' button, the rearrangement module 130 arranges the files or folders based on the adjustment by the user, and causes the files or folders to be displayed in the Windows Explorer in the sequence of the rearrangement. This operation is performed in an Internet server in the same way.

Figure 18:
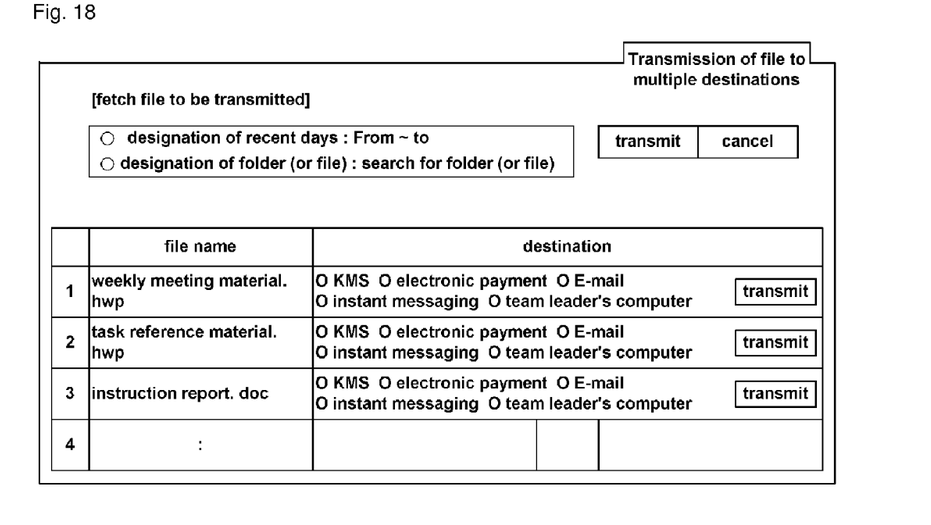

Thereafter, an example of a screen illustrating the operation of the integrated transmission module 140 is shown in FIG. 18.

With the increase in the number of communication paths, such as a central server system, an internal electronic payment system, instance messaging, email, and file transfer on a LAN, the number of destinations to which a single file must be transferred continuously increases. Although it is reasonable to integrate such transfer paths and, thus, reduce users' burden, the number of network paths is gradually increasing for various reasons, so that the integrated transmission module 140 of the present invention provides a function of integrating heterogeneous network channels, such as a central server system, an electronic payment system, instant messaging, email, a LAN and the like, and simultaneously transferring a file via the channels.

The user can transfer a file to necessary destinations through the screen shown in FIG. 18.

Figure 12:
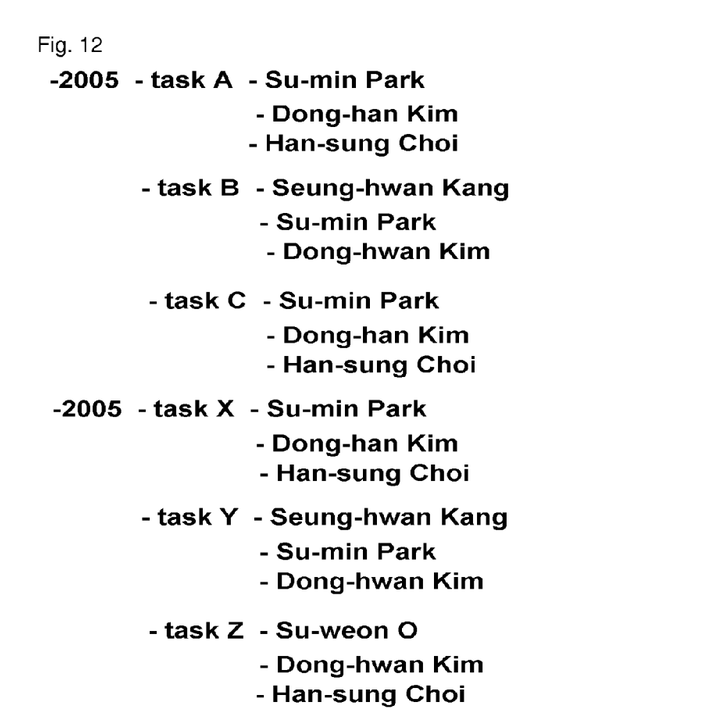
Figure 13:
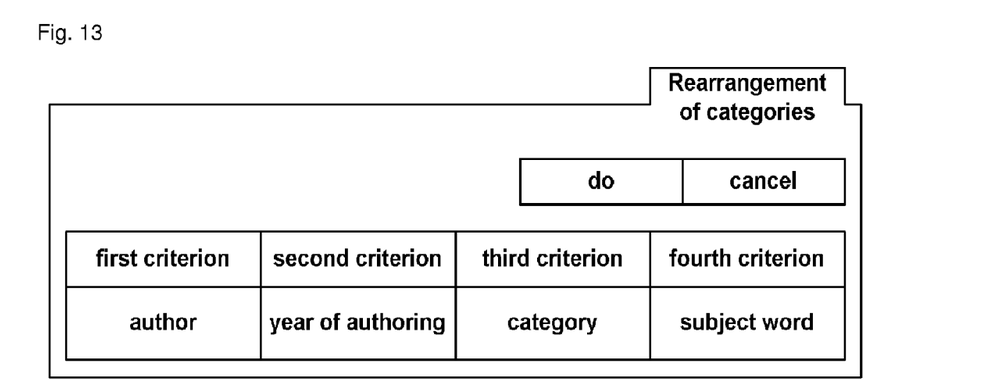
Figure 14:
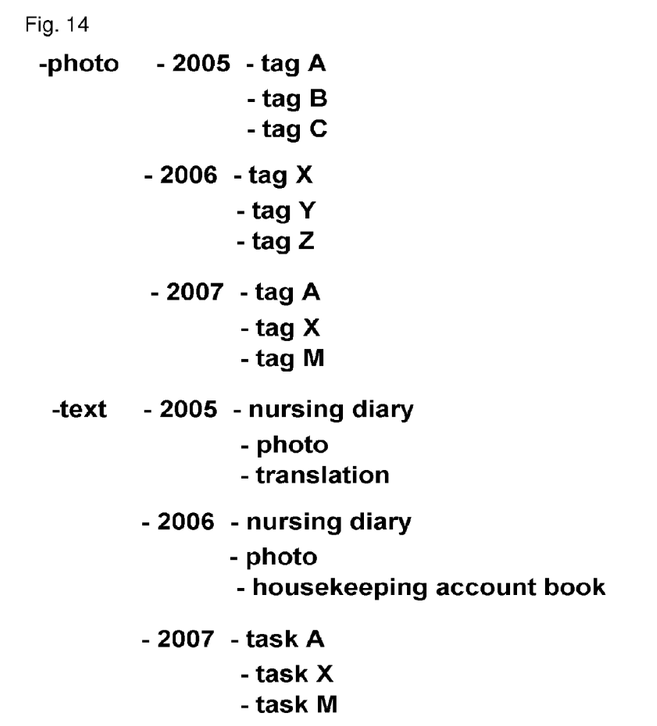
Figure 15:
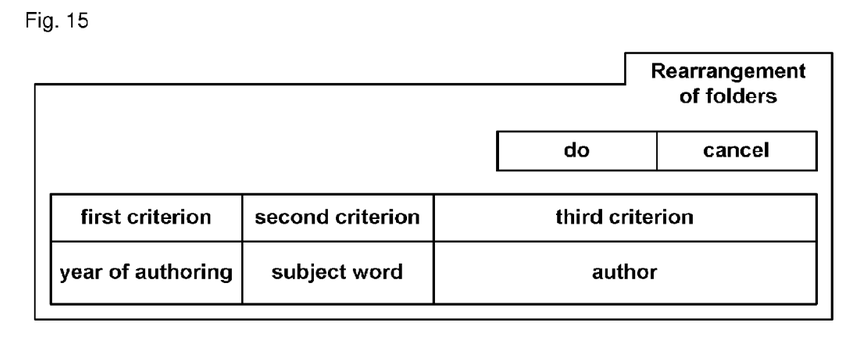
Figure 16:
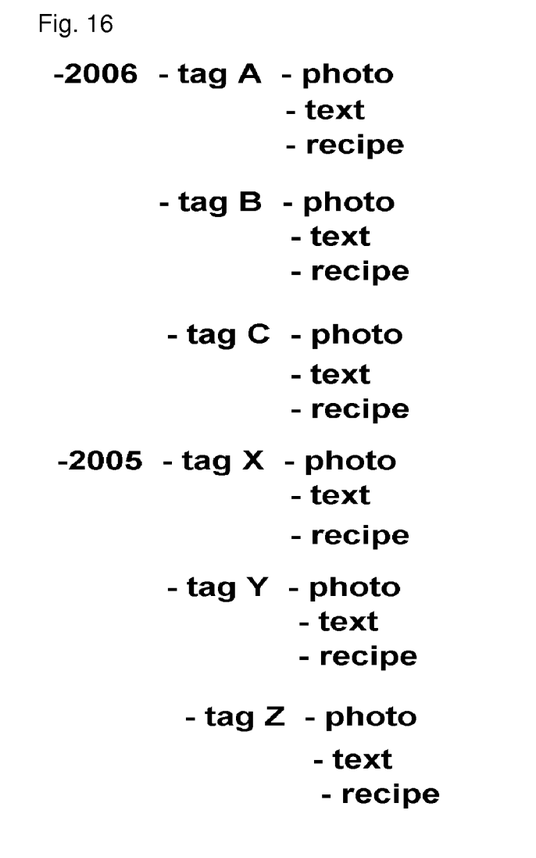

That is, the user selects a file to be sent, causes the screen shown in FIG. 12 to be output by running the integrated transmission module 140, and then selects destinations (method or means/locations). Here, in the case of a central server system or an electronic payment system, it is preferred that transmission destinations be registered in advance and transmission to relevant destinations be immediately performed only through selection. When email or messaging is selected, the integrated transmission module 140 displays a window that enables the entry or selection of transmission locations, and allows the user to enter email or messaging addresses.

Here, email or messaging addresses may be registered in advance, in which case the integrated transmission module 140 displays a window that enables the selection of the previously registered email or messaging addresses, and enables the entry of one or more new addresses.

When the input of the transmission method/locations is completed and then a transmission button is pressed, the integrated transmission module 140 sends the file using the entered transmission method/locations. For this purpose, the integrated transmission module 140 may run a separate instant messaging or email program.

Those skilled in the art to which the present invention pertains should appreciate that the above-described embodiments are, from every aspect, illustrative and not limitative because the present invention can be practiced in other specific forms without variation in the technical spirit or essential features thereof. It should be appreciated that the scope of the present invention is defined based on the following claims, rather than the detailed description and that all variations or modifications derived from the meaning, scope and equivalent concept of the claims pertain to the scope of the present invention.

The invention claimed is:

1. A non-transitory computer-readable recording medium for collectively managing a plurality of files stored and managed in at least one file storage device, the computer-readable recording medium comprising:
   a file search function that searches the plurality of the files stored in at least one storage device to find out a plurality of selected files that include at least one field of registration information which is selected for search by a user, lists and displays the selected files that include each selected field with the registration information of the selected files on a screen;
   a registration information management function that performs entry, deletion and modification of the registration information of the selected files and performs addition and deletion of at least one field of the registration information of the selected files in response to the user's input on the screen on which the selected files are listed;
   a rearrangement function that, when at least one field of the registration information of the selected files is selected by the user for rearrangement, performs rearranging each selected field of the selected files by changing a related folder structure and rearranging the files and folders; and
   an integrated transmission function that enables a transmission method/location of the plurality of transmitting files to be selected for transmission by the user on a single screen, and transmits each of the transmitting files to the relevant transmission location using the relevant transmission method,
   wherein the registration information management function further performs, when a plurality of changing files among the selected files are selected by the user for changing the registration information thereof, collectively changing the registration information of the changing files with a single input of the user,
   wherein the rearrangement function is a function of arranging the files and the folders in a sequence designated by the user, and
   wherein the file transmission method/location is any one of an external system connected over a network, email and instant messaging.

\* \* \* \* \*